United States Patent
Neveu et al.

(10) Patent No.: US 9,851,022 B2
(45) Date of Patent: Dec. 26, 2017

(54) MOUNTING SYSTEM OF AT LEAST TWO PIPES

(71) Applicant: Airbus Operations (S.A.S.), Toulouse (FR)

(72) Inventors: Anne-Laure Neveu, Toulouse (FR); Richard Brethes, Grenade (FR); Alexandre Maurel, Lasserre (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/662,758

(22) Filed: Mar. 19, 2015

(65) Prior Publication Data
US 2015/0267842 A1    Sep. 24, 2015

(30) Foreign Application Priority Data
Mar. 20, 2014    (FR) ...................................... 14 52323

(51) Int. Cl.
| | | |
|---|---|---|
| *B64C 1/40* | (2006.01) | |
| *F16L 3/02* | (2006.01) | |
| *F16L 3/10* | (2006.01) | |

(52) U.S. Cl.
CPC ................ *F16L 3/02* (2013.01); *B64C 1/406* (2013.01); *F16L 3/1058* (2013.01)

(58) Field of Classification Search
CPC . F16L 3/02; F16L 3/1058; F16L 3/233; F16L 3/137; B64C 1/406; B64C 1/00; F16B 21/073; H02G 3/30
USPC ......... 248/49, 62, 68.1, 70, 71, 73, 74.1, 75, 248/67.7; 244/119, 131
See application file for complete search history.

(56) References Cited

U.S. PATENT DOCUMENTS

| | | | |
|---|---|---|---|
| 4,445,656 A | 5/1984 | Leitch et al. | |
| 7,621,486 B1 * | 11/2009 | Barrepski | F16L 3/127 248/228.7 |
| 7,896,296 B2 * | 3/2011 | Julian | F16L 3/127 248/547 |
| 8,356,778 B2 * | 1/2013 | Birli | F16L 3/127 248/65 |
| 8,678,325 B2 * | 3/2014 | Arzate-Engels | B60R 16/0215 248/68.1 |

(Continued)

FOREIGN PATENT DOCUMENTS

| | | |
|---|---|---|
| DE | 100 16 225 A1 | 10/2001 |
| FR | 94 149 E | 7/1969 |
| FR | 2 962 716 A1 | 1/2012 |

OTHER PUBLICATIONS

French Search Report for Application No. 1452323 dated Nov. 7, 2014.

*Primary Examiner* — Muhammad Ijaz
(74) *Attorney, Agent, or Firm* — Jenkins, Wilson, Taylor & Hunt, P.A.

(57) ABSTRACT

A mounting system for pipes, the mounting system including a mounting plate for being fixed onto a support, a pipe holder integral with the mounting plate and including a first supporting surface and a second supporting surface, each supporting surface being designed to accommodate a pipe and including a different shape from that of the other supporting surface, and adjustment structure designed to ensure a displacement of the pipe holder on the mounting plate along an adjustment direction and to ensure a blocking of the pipe holder on the mounting plate.

9 Claims, 6 Drawing Sheets

(56) References Cited

U.S. PATENT DOCUMENTS

| | | | | |
|---|---|---|---|---|
| 8,894,022 B2* | 11/2014 | Chirpich | ................ | F16L 3/137 248/228.8 |
| 2003/0230678 A1* | 12/2003 | Bellmore | ............. | F16L 3/1203 248/68.1 |
| 2004/0051015 A1* | 3/2004 | Ohrling | ............... | A47B 96/065 248/214 |
| 2005/0204519 A1* | 9/2005 | Zeuner | .................... | H02G 3/30 24/457 |
| 2006/0113442 A1* | 6/2006 | Plate | ....................... | B64C 1/00 248/228.1 |
| 2006/0131465 A1* | 6/2006 | Lynch, Jr. | ............ | F16L 3/2235 248/68.1 |
| 2010/0116947 A1* | 5/2010 | Winkler | ................... | F16L 3/06 248/73 |
| 2010/0294896 A1* | 11/2010 | Sayilgan | ................ | B64C 1/406 248/73 |
| 2011/0309196 A1* | 12/2011 | Sabadie | ................. | B64C 1/406 244/131 |
| 2011/0309197 A1* | 12/2011 | Holvoet | ................... | B64C 1/40 244/131 |
| 2013/0146721 A1* | 6/2013 | White | ...................... | H02G 3/32 248/68.1 |
| 2014/0202525 A1* | 7/2014 | Janssens | ............... | F24J 2/5256 136/251 |

\* cited by examiner

MOUNTING SYSTEM OF AT LEAST TWO PIPES

CROSS-REFERENCE TO RELATED APPLICATION

This application claims the benefit of and priority to French patent application No. 14 52323 filed on Mar. 20, 2014, the entire disclosure of which is incorporated by reference herein.

BACKGROUND

The disclosure herein relates to a mounting system for pipes. In an aircraft, there are different types of pipes. In particular, there are pipes with circular sections, and pipes with elliptical sections. Each type of pipe is attached by a specific mounting system. That is to say, there are as many types of mounting systems as there are types of pipes.

The embodiment of all these different mounting systems is therefore not compatible with any ease of implementation, since the correct mounting system must be chosen as a function of the pipe to be mounted, nor with any ease of organization, since stocks must be managed for each mounting system.

SUMMARY

One object of this disclosure is to propose a pipe mounting system that does not present the disadvantages of the prior art, and that is compatible in particular with pipes presenting or comprising different profiles.

To that effect, a mounting system for pipes is proposed, the mounting system comprising:
  a mounting plate for being fixed onto a support,
  a pipe holder integral with or attachable to the mounting plate presenting or comprising a first supporting surface and a second supporting surface, each supporting surface being designed to accommodate a pipe and presenting or comprising a different shape or curved profile from that of the other supporting surface, the first supporting surface being centered on a central plane of the mounting system and the second supporting surface being divided into two sub-surfaces, arranged symmetrically on either side of the central plane and,
  an adjustment structure designed to ensure a displacement of the pipe holder on the mounting plate along an adjustment direction and to ensure a locking of the pipe holder on the mounting place,
  the mounting system further comprising two separate arms which are fastened in a mobile manner to the pipe holder by a mounting structure and arranged symmetrically on either side of the first supporting surface, each arm comprising at least one complementary supporting surface, the at least one complementary supporting surfaces of each arm being symmetrical with each other with respect to the central plane of symmetry, forming a supporting surface for a pipe, and comprising at least one different shape or curved profile from the first and second supporting surfaces.

Such a mounting system can therefore be adjusted in position and can alternatively receive pipes of different profiles, in particular, at least one circular profile and at least one elliptical profile.

BRIEF DESCRIPTION OF THE DRAWINGS

The abovementioned characteristics of the disclosure herein, as well as others, will emerge more clearly on reading the following description of an embodiment example, the description being made with reference to the attached drawings, among which:

FIGS. 7-10 are diagrammatic views of a mounting system according to the disclosure herein, the respective views showing a pipe installed on one of the supporting surfaces or complementary supporting surfaces thereof.

DETAILED DESCRIPTION

Figure 1:
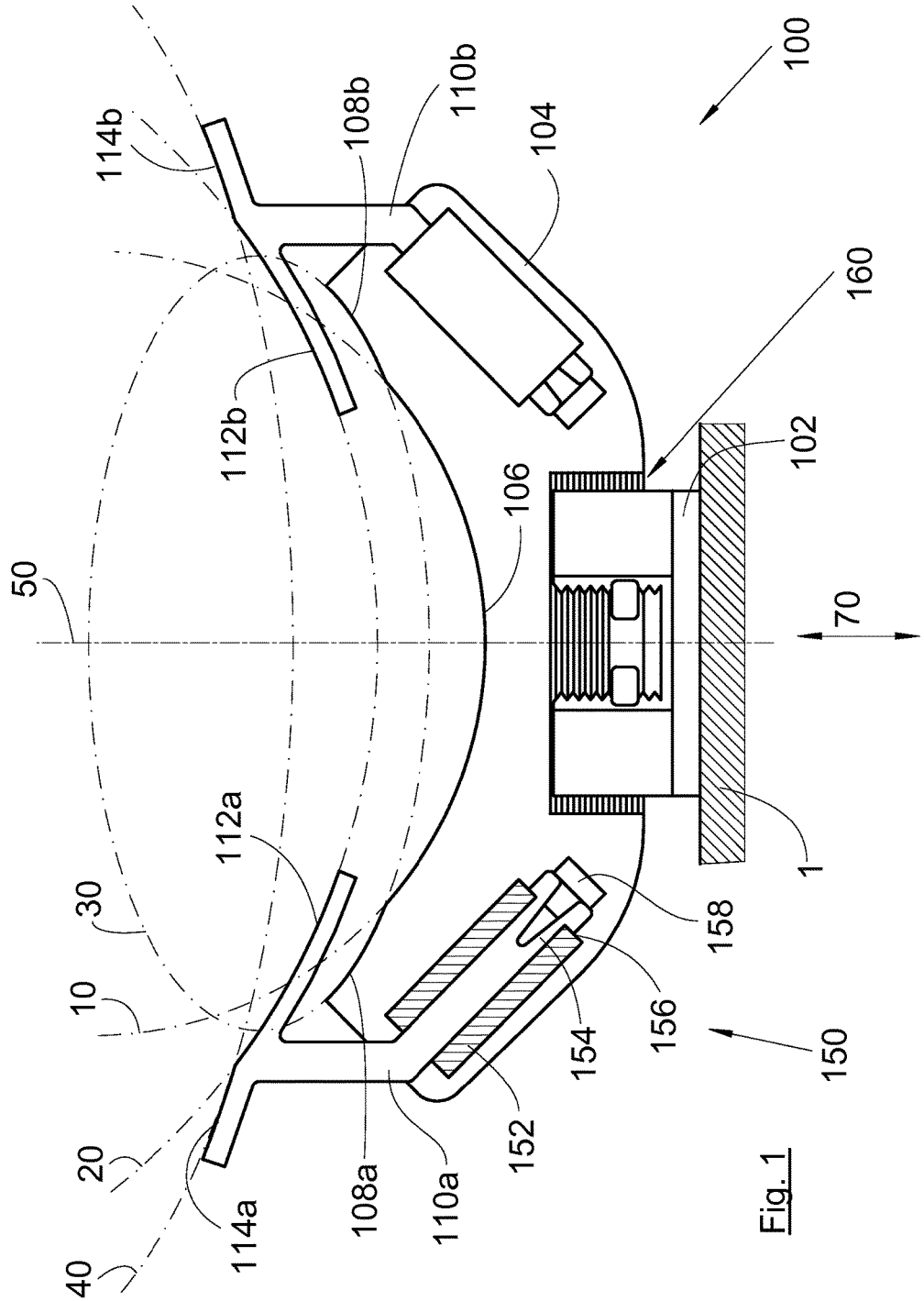
FIG. 1 is a diagrammatic view of a mounting system according to the disclosure herein, the system including a mounting plate on which is attached a pipe holder, equipped with two arms, and adjustable in position.

FIG. 1 shows a mounting system 100, which allows pipes 10, 20, 30 and 40, having different sections and diameters, to be held.

FIG. 1 shows, as an example:
  a pipe 10 having a circular section and a diameter d,
  a pipe 20 having a circular section and a diameter D>d,
  a pipe 30 having an elliptical section with a large axis L1 and a small axis I1, and
  a pipe 40 having an elliptical section with a large axis L2>L1 and a small axis I2>I1.

The mounting system 100 comprises a mounting plate 102 for being fastened to a support 1, such as, for example, the structure of an aircraft, comprising at least one pipe 10, 20, 30, 40, and a pipe holder 104 presenting or comprising a central plane 50 of symmetry, and which is integral with the mounting plate 102, while being adjustable in position along the latter.

The pipe holder 104 comprises a first supporting surface 106 and a second supporting surface 108a-b. The two supporting surfaces 106 and 108a-b are arranged on the other side of the pipe holder 104 relative to the mounting plate 102.

The two supporting surfaces 106 and 108a-b are distinct and of different shapes. Each supporting surface 106, 108a-b can therefore accommodate a pipe 10, 30 having different sections.

In order to complete the mounting of the pipe 10, 30, the mounting system 100 is completed with a clamp that encloses the pipe 10, 30 and fastens to the pipe holder 104 as described below.

The creation of at least two supporting surfaces 106 and 108a-b on the same pipe holder 104 therefore allows the installation of at least two pipes 10 and 30 having different sections, thus allowing the mounting systems 100 to be shared for different types of pipe 10 and 30.

In order to ensure the displacement of the pipe holder 104 on the mounting plate 102, the mounting system 100 comprises adjustment structure 160, designed to ensure the displacement and blocking of the pipe holder 104 relative to the mounting plate 102 along an adjustment direction 70, which is perpendicular here to the plane of the support 1.

The first supporting surface 106 takes a central position, centered on the central plane 50, whereas the second supporting surface 108*a-b* is divided into two sub-surfaces 108*a* and 108*b,* arranged symmetrically on either side of the first supporting surface 106, and therefore of the central plane 50.

Figure 7:
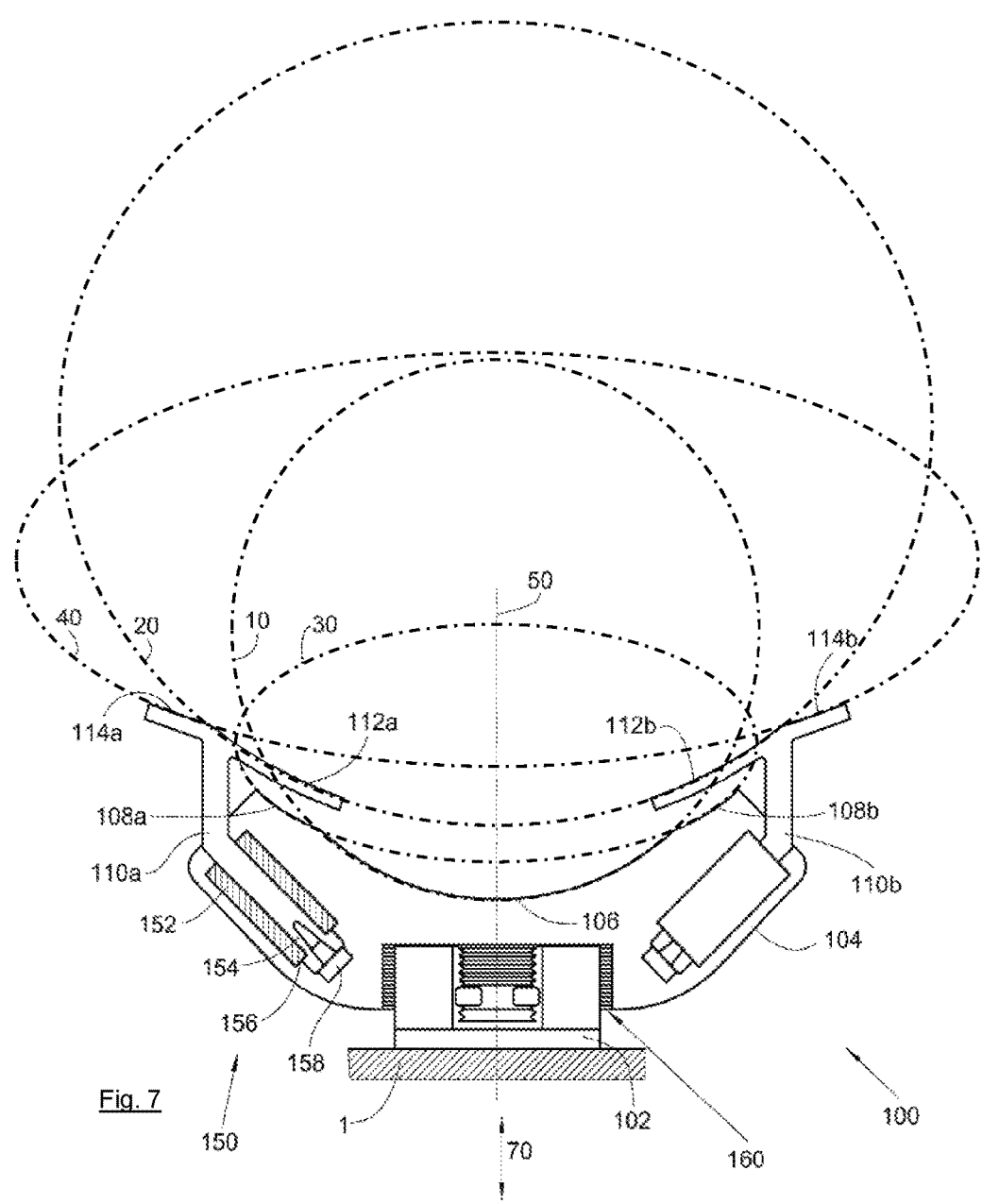

It is therefore possible to support a pipe 10 on the first supporting surface 106 (see, e.g., FIG. 7), or to support a pipe 30 simultaneously on the two sub-surfaces 108*a* and 108*b* (see, e.g., FIG. 8).

In the embodiment of the disclosure herein shown in FIG. 1, the first supporting surface 106 comprises a profile as an arc of a circle matching the pipe 10, that is to say, having a diameter d, and the two sub-surfaces 108*a* and 108*b* comprise profiles as arcs of an ellipse matching the pipe 30, that is to say, having a large axis L1 and a small axis I1. In order to increase the number of possibilities and therefore to allow the installation of a larger number of pipes 20 and 40, the mounting system 100 can be completed with two arms 110*a-b*, which are fastened in a mobile manner to the pipe holder 104, and arranged symmetrically on either side of the first supporting surface 106, and therefore of the central plane 50.

Each arm 110*a-b* comprises at least one complementary supporting surface 112*a-b*, 114*a-b*, having a different shape from the two supporting surfaces 106 and 108*a-b*.

In the embodiment of the disclosure herein shown in FIG. 1, each arm 110*a-b* comprises two complementary supporting surfaces 112*a-b* and 114*a-b*. Each complementary supporting surface 112*a-b*, 114*a-b* of an arm 110*a-b* forms, with the complementary supporting surface 112*a-b*, 114*a-b* of the other arm 110*b-a*, which itself is symmetrical relative to the central plane 50, a supporting surface for a same pipe 20, 40.

In the embodiment of the disclosure herein shown in FIG. 1, the two complementary supporting surfaces 112*a-b* each comprises a profile as an arc of a circle matching the pipe 20 (see, e.g., FIG. 9), that is to say having a diameter D, and the two complementary supporting surfaces 114*a-b* each comprises a profile as an arc of an ellipse matching the pipe 40 (see, e.g., FIG. 10) that is to say, having a large axis L2 and a small axis I2.

Figure 2:
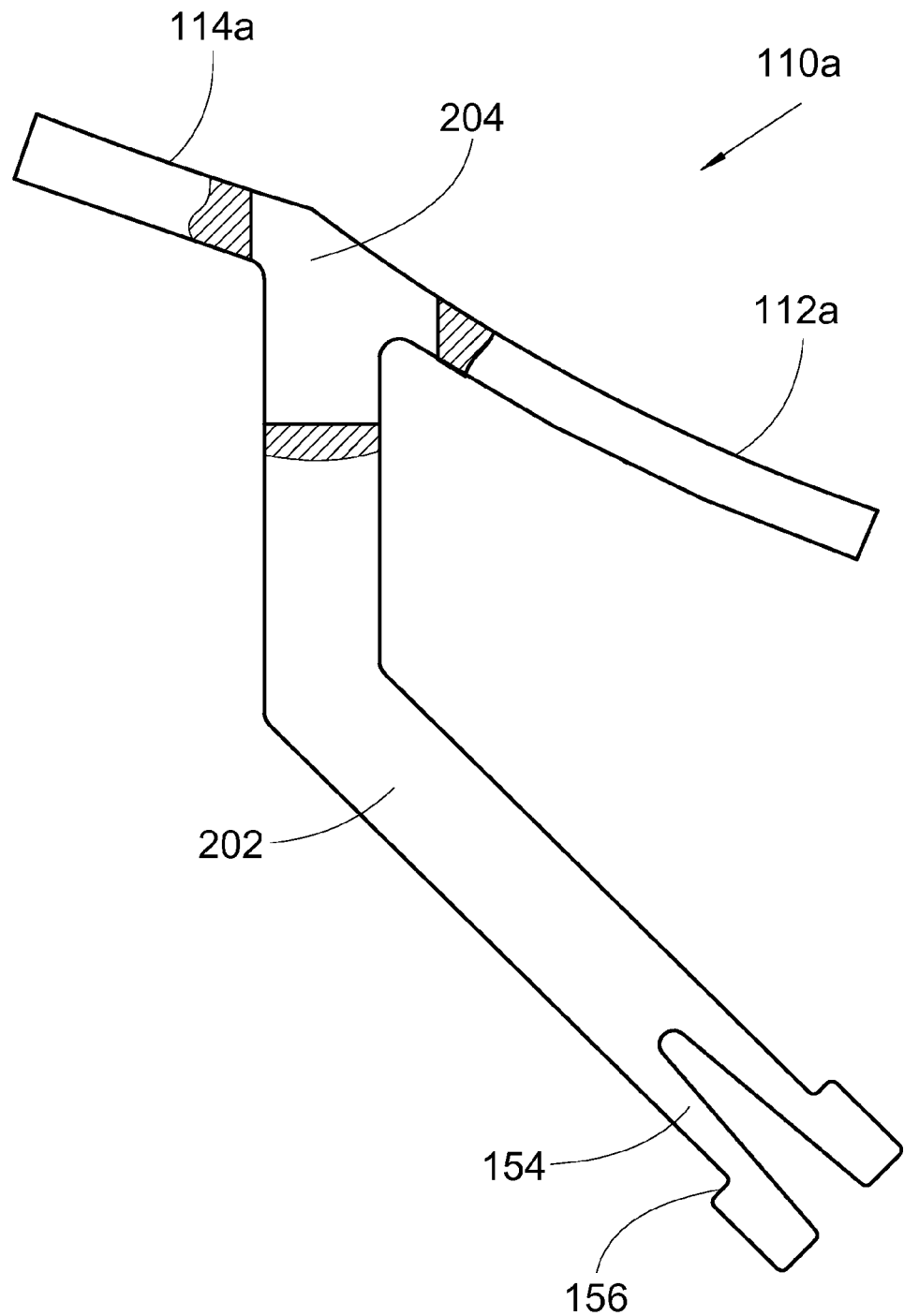
FIG. 2 shows an arm of the mounting system according to the disclosure herein.

FIG. 2 shows an arm 110*a,* which comprises the two complementary supporting surfaces 112*a* and 114*a* and a mast 202 for being fastened to the pipe holder 104.

For that purpose, the mounting system 100 comprises mobile structure of mounting 150, distributed in part on the arm 110*a,* and more particularly the mast 202, and on the pipe holder 104. The mounting structure 150 is called mobile if the arm 110*a* and the pipe holder 104 can be fastened to each other or separated from each other without destroying either one or the other.

In the embodiment of the disclosure herein shown in FIG. 1, the mounting structure 150 comprises a tunnel 152 and a stop 158 integral with the pipe holder 104, and two elastic tongue-like strips 154 made at the extremity of the mast 202, and each presenting or comprising a hook 156 at its extremity, turned towards the exterior.

Assembly then consists of inserting the two elastic tongue-like strips 154 through one of the extremities of the tunnel 152 with the help of pressure on the hooks 156 until the two hooks 156 emerge through the other end of the tunnel 152. The stop 158 is arranged opposite and at a distance from the other extremity of the tunnel 152, and the two elastic tongue-like strips 154 come to bear against the stop 158 and spread outwards, the hooks 156 then coming to lie against the sides of the tunnel 152 and to be located between the sides of the tunnel 152 and the stop 158.

Figure 3:
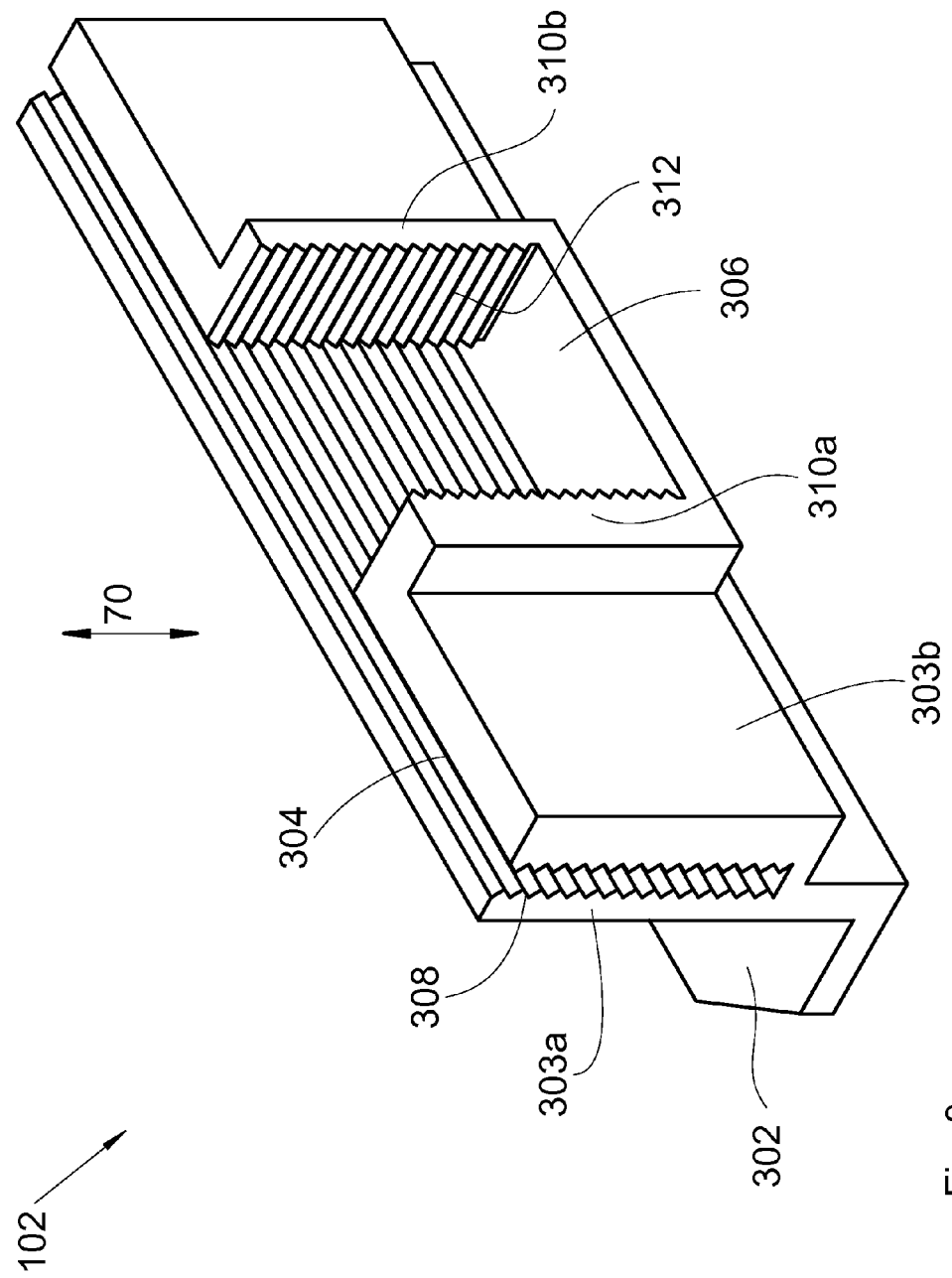
FIG. 3 shows a mounting plate of the mounting system according to the disclosure herein.

FIG. 3 shows an example of a mounting plate 102 that includes:

a base 302 designed to be mounted on the support 1, for example by screwing, bonding or otherwise, and two sides 303*a* and 303*b,* between them defining a slot 304 in which the pipe holder 104 is designed to be inserted parallel to the adjustment direction 70.

On the faces of the two sides 303*a* and 303*b* that face each other, that is to say, the interior faces of the slot 304, serrations 308 are made perpendicular to the adjustment direction 70.

Figure 4:
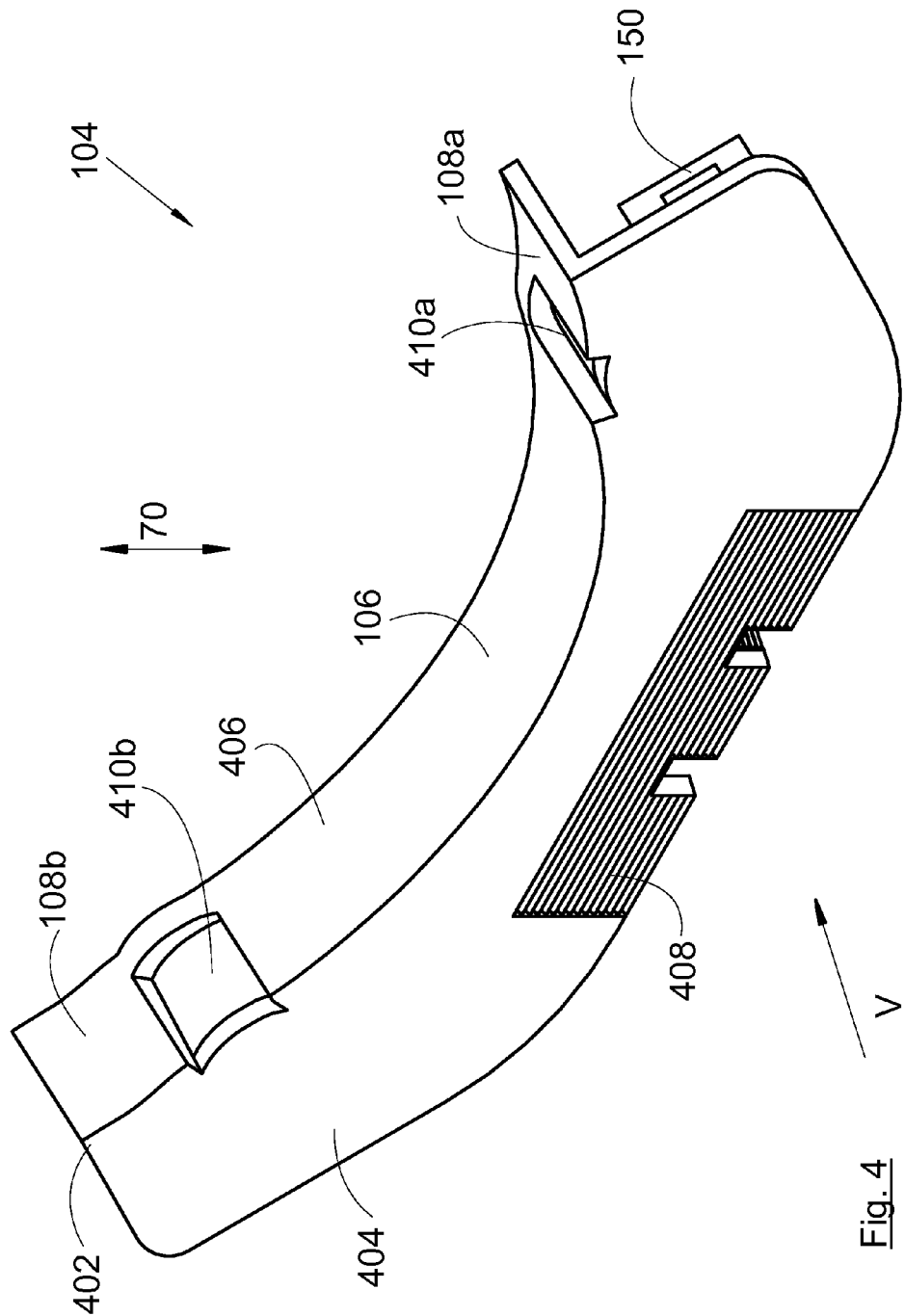
FIG. 4 shows a pipe holder of the mounting system according to the disclosure herein.

FIG. 4 shows an example of a pipe holder 104 that includes a body 402, here with a section substantially in L, and which comprises a first flange 404 parallel to the guidance or adjustment direction 70, and a second flange 406 on which the first supporting surface 106 and the second supporting surface 108*a-b* are created.

Figure 5:
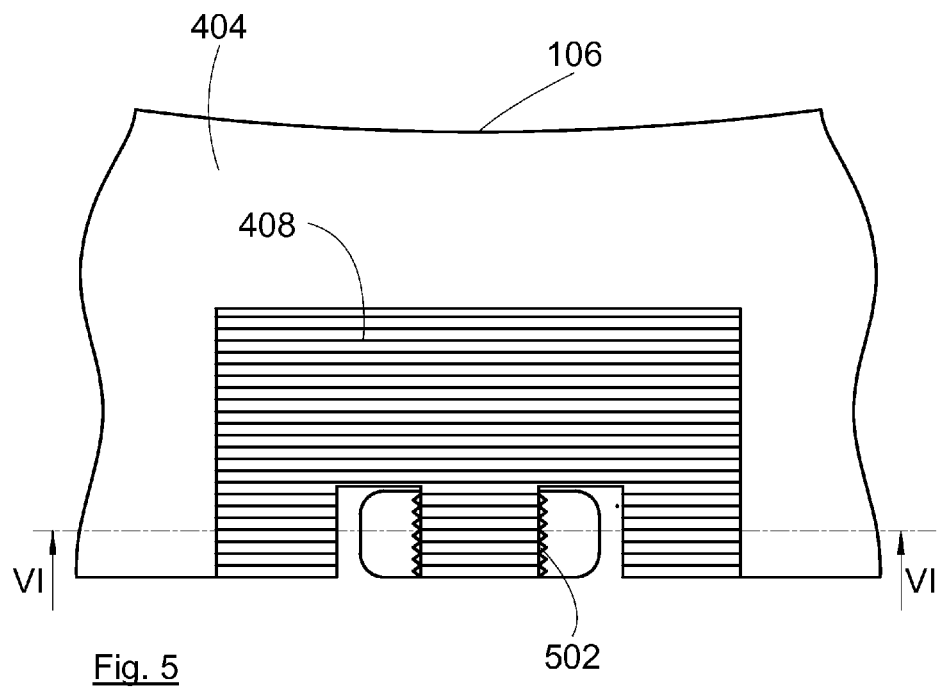
FIG. 5 shows a detail of the pipe holder viewed along the arrow V of FIG. 4.
Figure 6:
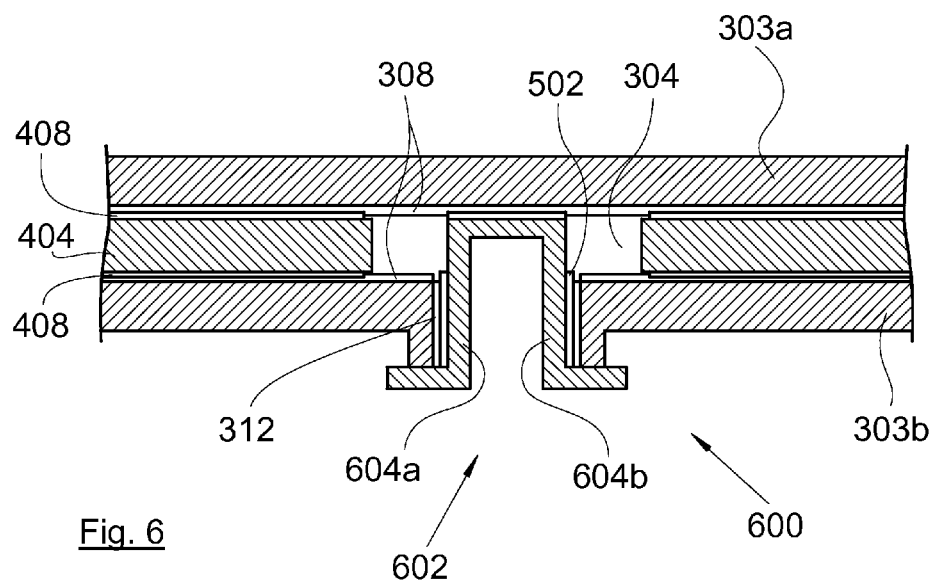
FIG. 6 is a section through the mounting system along the line VI-VI of FIG. 5.

FIG. 5 shows a view along the arrow V of a detail of the pipe holder 104, and FIG. 6 shows a section along the line VI-VI of the mounting system 100.

The first flange 404 is for being inserted into the slot 304 and comprises, on each of its faces, serrations 408 perpendicular to the adjustment direction 70, and for cooperating with the serrations 308 of the mounting plate 102 in order to ensure the positioning of the pipe holder 104 along the guidance direction 70.

The adjustment structure 160 here comprises or consists of serrations 308 and 408.

In order to ensure better holding of the pipe holder 104 on the mounting plate 102, the mounting system 100 comprises a complementary mounting system 600.

The mounting plate 102 comprises an opening 306 made in one of the sides 303*b.* The opening 306 comprises two lateral sides 310*a* and 310*b* parallel to the adjustment direction 70, and it is open on the side through which the pipe holder 104 is inserted in the slot 304, here from the top in FIG. 3.

Each lateral side 310*a-b* extends from the exterior of the side 303*b* up to the slot 304. The faces of the lateral sides 310*a* and 310*b* that face each other comprise serrations 312 perpendicular to the adjustment direction 70.

In the embodiment presented here, the serrations 312 are also perpendicular to the side 303*b.*

The pipe holder 104 comprises a protuberance 602, which here projects from the first flange 404 and which is designed to be inserted in the opening 306 when the pipe holder 104 is inserted in the slot 304 along the guidance direction 70.

The faces of the protuberance 602 which come to be opposite the serrations 312 of the opening 306 also support serrations 502 for cooperating with the serrations 312 of the opening 306 in order to ensure blocking of the pipe holder 104 along the guidance direction 70.

The complementary mounting system 600 then consists of the opening 306 and its serrations 312, as well as the protuberance 602 and its serrations 502.

The protuberance 602 consists of two flexible sides 604*a* and 604*b,* arranged here in parallel, each flexible side 604*a-b* supporting one of the faces of the protuberance 602, which comprises the serrations 502.

The flexibility of the two flexible sides 604*a* and 604*b* allows the two flexible sides 604*a* and 604*b* to be tightened, which causes the serrations 502 of the flexible sides 604*a* and 604*b* to spread out from the serrations 312 of the opening 306 and therefore reduces the holding force of the pipe holder 104 on the mounting plate 102 and facilitates the displacement of the pipe holder 104 on the mounting plate 102 parallel to the guidance direction 70.

The different elements of the mounting system 100 are advantageously made by plastic moulding.

As specified above, the pipe 10, 20, 30, 40 is held by a clamp, which adopts the shape of a closed loop.

The pipe holder 104 comprises two passages 410a and 410b, which here pass through the second flange 406, each being localized between the first supporting surface 106 and one of the two sub-surfaces 108a and 108b.

In the case of the pipe 10, the clamp passes under the first supporting surface 106, passes through the two passages 410a and 410b and encloses the pipe 10.

In the case of the pipe 30, the clamp passes under each sub-surface 108a, 108b, passes through the two passages 410a and 410b and encloses the pipe 30.

In the same way, each arm 110a-b comprises a passage 204 localized between the two complementary supporting surfaces 112a and 114a, and which also opens out beneath the two complementary supporting surfaces 112a and 114a.

In the case of the pipe 20, the clamp passes under each complementary supporting surface 112a, passes through each tunnel 204 while rising above each complementary supporting surface 114a, and encloses the pipe 20.

In the case of the pipe 40, the clamp passes above each complementary supporting surface 112a, passes through each passage 204, passes under each complementary supporting surface 114a, and encloses the pipe 40.

FIGS. 7-10 are diagrammatic views of a mounting system 100 according to the disclosure herein, the respective views showing a pipe installed on one of the supporting surfaces or complementary supporting surfaces thereof.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mounting system for pipes, the mounting system comprising:
   a mounting plate for being fixed onto a support;
   a pipe holder attachable to the mounting plate and comprising a first pipe supporting surface and a second pipe supporting surface, the first pipe supporting surface comprising a first curved profile and the second pipe supporting surface comprising a second curved profile, the first curved profile differing from the second curved profile, the first pipe supporting surface being configured to accommodate a first pipe having a shape matching the first curved profile and the second pipe supporting surface being configured to accommodate a second pipe having a shape matching the second curved profile, the first pipe supporting surface being centered on a central plane of the mounting system and the second pipe supporting surface being divided into two sub-surfaces, each sub-surface being arranged symmetrically on either side of the central plane; and
   an adjustment structure to allow displacement of the pipe holder on the mounting plate along an adjustment direction and to ensure a locking of the pipe holder on the mounting plate,
   the mounting system further comprising first and second arms which are removably fastened to the pipe holder by a mounting structure and arranged symmetrically on either side of the first pipe supporting surface, the first and second arms each comprising at least one complementary pipe supporting surface, respectively, the at least one complementary pipe supporting surface of the first arm being symmetrical with a corresponding complementary pipe supporting surface of the second arm with respect to the central plane of symmetry, the complementary pipe supporting surfaces together forming a third pipe supporting surface comprising at least a third curved profile, which is different from the first and second pipe supporting surfaces and is configured to accommodate a third pipe having a shape matching the third curved profile,
   wherein only one of the first, second, or third pipe supporting surfaces can hold only one of the first, second, or third pipes at a time, respectively, while others of the first, second, or third pipe supporting surfaces are blocked from holding any other pipes.

2. The mounting system according to claim 1, wherein the pipe holder comprises two passages and wherein each passage is localized between the first pipe supporting surface and one of the two sub-surfaces.

3. The mounting system according to claim 1, wherein the first curved profile comprises a first arc, which has a first radius, wherein the second curved profile comprises one or more second arcs, which have a second radius, and wherein the first radius is different from the second radius.

4. The mounting system according to claim 3, wherein the at least one complementary pipe supporting surface comprises a first complementary pipe supporting surface, which has the third curved profile with a third radius, and a second complementary pipe supporting surface, which has a fourth curved profile with a fourth radius, wherein each of the first radius, the second radius, the third radius, and the fourth radius are different from each other.

5. The mounting system according to claim 1, wherein the pipe holder comprises a first flange comprising, on each face thereof, serrations oriented perpendicular to the adjustment direction, wherein the mounting plate comprises two parallel sides defining a slot therebetween, into which the first flange is designed to be inserted parallel to the adjustment direction, and wherein an interior face of the two parallel sides comprises serrations formed therein, the serrations being oriented perpendicular to the adjustment direction and configured to cooperate with the serrations of the first flange to ensure positioning of the pipe holder along the adjustment direction.

6. The mounting system according to claim 5, wherein the mounting plate comprises an opening in one of the two parallel sides, wherein the opening comprises two lateral sides oriented perpendicular to a plane defining the slot and open on the side through which the pipe holder is inserted in the slot, wherein faces of the lateral sides that face each other comprise serrations oriented perpendicular to the adjustment direction, wherein the pipe holder comprises a protuberance designed to be inserted in the opening when the pipe holder is inserted in the slot, and wherein faces of the protuberance, which come to be opposite the serrations of the faces of the two lateral sides, comprise serrations for cooperating with the serrations of the faces of the two lateral sides.

7. The mounting system according to claim 6, wherein the protuberance comprises two flexible sides, each flexible side being configured to support one of the faces of the protuberance which comprises the serrations.

8. The mounting system according to claim 1, wherein, when the first, second, or third pipe supporting surfaces are occupied by the first, second or third pipes, respectively, the first, second, or third pipe supporting surfaces that are not occupied by the first second, or third pipes are blocked to prevent installation of any other pipe.

9. The mounting system according to claim 1, wherein the at least one complementary pipe supporting surface comprises a first complementary pipe supporting surface, which has the third curved profile with a third radius, and a second complementary pipe supporting surface, which has a fourth curved profile with a fourth radius, wherein the third radius is different from the fourth radius.

* * * * *